(12) United States Patent
Lai et al.

(10) Patent No.: US 8,448,072 B1
(45) Date of Patent: May 21, 2013

(54) INTERCEPTION OF AUTOMATIC STATUS UPDATES FOR A SOCIAL NETWORKING SYSTEM

(75) Inventors: Harry Hong-Lun Lai, Overland Park, KS (US); Allison Anna DiMartino, Overland Park, KS (US); Jason W. Rincker, Overland Park, KS (US); Christine D. Schumaker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 527 days.

(21) Appl. No.: 12/755,556

(22) Filed: Apr. 7, 2010

(51) Int. Cl.
*G06F 3/00* (2006.01)
*G06F 7/04* (2006.01)
*G06F 17/30* (2006.01)
*G06F 9/44* (2006.01)
*G06F 9/46* (2006.01)
*G06F 13/00* (2006.01)
*H04N 7/16* (2011.01)

(52) U.S. Cl.
USPC ............. 715/753; 715/748; 726/27; 719/313

(58) Field of Classification Search
None
See application file for complete search history.

(56) References Cited

U.S. PATENT DOCUMENTS

| | | | |
|---|---|---|---|
| 6,047,264 A | 4/2000 | Fisher et al. | |
| 7,133,846 B1 | 11/2006 | Ginter et al. | |
| 7,249,123 B2 | 7/2007 | Elder et al. | |
| 7,512,628 B2 | 3/2009 | Chess et al. | |
| 2005/0099302 A1* | 5/2005 | Lieffort et al. | 340/572.7 |
| 2005/0148331 A1 | 7/2005 | Sharon et al. | |
| 2005/0165785 A1 | 7/2005 | Malkin et al. | |
| 2006/0041484 A1 | 2/2006 | King et al. | |
| 2006/0123338 A1* | 6/2006 | McCaffrey et al. | 715/531 |
| 2007/0032194 A1 | 2/2007 | Griffin | |
| 2007/0281690 A1 | 12/2007 | Altman et al. | |
| 2007/0281716 A1 | 12/2007 | Altman et al. | |
| 2008/0065604 A1 | 3/2008 | Tiu et al. | |
| 2008/0070593 A1 | 3/2008 | Altman et al. | |
| 2008/0133336 A1 | 6/2008 | Altman et al. | |
| 2009/0063983 A1* | 3/2009 | Amidon et al. | 715/733 |
| 2009/0134181 A1 | 5/2009 | Wachman et al. | |
| 2010/0175001 A1* | 7/2010 | Lazarus et al. | 715/753 |
| 2011/0030067 A1* | 2/2011 | Wilson | 726/27 |

\* cited by examiner

*Primary Examiner* — Stephen Alvesteffer

(57) ABSTRACT

A wireless communication device comprises a wireless communication interface, a user interface, and a processing system. The wireless communication interface is configured to detect a wireless signal that indicates status update information for a social networking application. The processing system is configured to monitor the social networking application for an attempt to transfer the status update information for delivery to a social networking system, and if the social networking application attempts the transfer, to delay the transfer and direct the user interface to prompt a user to edit the status update information. The user interface is configured to receive edit instructions from the user. The processing system is configured to process the edit instructions to edit the status update information and to direct the wireless communication interface to wirelessly transfer the edited status update information for delivery to the social networking system.

20 Claims, 6 Drawing Sheets

INTERCEPTION OF AUTOMATIC STATUS UPDATES FOR A SOCIAL NETWORKING SYSTEM

TECHNICAL BACKGROUND

Many individuals are increasingly utilizing wireless communication devices to remain in contact with business associates and friends. For example, a user of a wireless communication device may utilize voice calls, voice mail messages, email, Short Message Service (SMS) text messages, Instant Messaging (IM) applications, and other data services to stay in touch with various contacts. In addition, some social networking systems, such as the websites Facebook (www.facebook.com) and Twitter (www.twitter.com), allow a user to stay in touch with a group of friends by posting status updates. Typically, a user may access a social networking system to update status information associated with the user's profile. For example, if the user goes to a coffee shop, the user may connect to the social networking system and post a status update message that indicates the location of the coffee shop so that others may meet the user there if they are in the proximity.

Some social networking systems have an associated social networking application which may be installed on the user's wireless communication device. In this case, the user may access the social networking system via the social networking application. The social networking application allows the user to update status information associated with the user's profile on the social networking system. In addition to enabling the user to access the social networking system, the social networking application may also automatically update the user's status information.

OVERVIEW

A wireless communication device comprises a wireless communication interface, a user interface, and a processing system. The wireless communication interface is configured to detect a wireless signal that indicates status update information for a social networking application. The processing system is configured to monitor the social networking application for an attempt to transfer the status update information for delivery to a social networking system, and if the social networking application attempts the transfer, to delay the transfer and direct the user interface to prompt a user to edit the status update information. The user interface is configured to prompt the user to edit the status update information and to receive edit instructions from the user. The processing system is configured to process the edit instructions to edit the status update information and to direct the wireless communication interface to transfer the edited status update information for delivery to the social networking system. The wireless communication interface is configured to wirelessly transfer the edited status update information for delivery to the social networking system.

A wireless communication device comprises a wireless communication interface, a user interface, and a processing system. The wireless communication interface is configured to detect a wireless signal that indicates status update information for a social networking application. The processing system is configured to monitor the social networking application for an attempt to transfer the status update information for delivery to a social networking system, and if the social networking application attempts the transfer, to delay the transfer and direct a user interface to prompt a user to approve, reject, or edit the status update information. The user interface is configured to prompt the user to approve, reject, or edit the status update information and to receive an approval instruction, a rejection instruction, or edit instructions from the user. In response to the approval instruction, the processing system is configured to process the approval instruction to direct the wireless communication interface to transfer the status update information for delivery to the social networking system, and the wireless communication interface is configured to wirelessly transfer the status update information for delivery to the social networking system. In response to the rejection instruction, the processing system is configured to process the rejection instruction to prevent the transfer of the status update information to the social networking system. In response to the edit instructions, the processing system is configured to process the edit instructions to edit the status update information and to direct the wireless communication interface to transfer the edited status update information for delivery to the social networking system, and the wireless communication interface is configured to wirelessly transfer the edited status update information for delivery to the social networking system.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
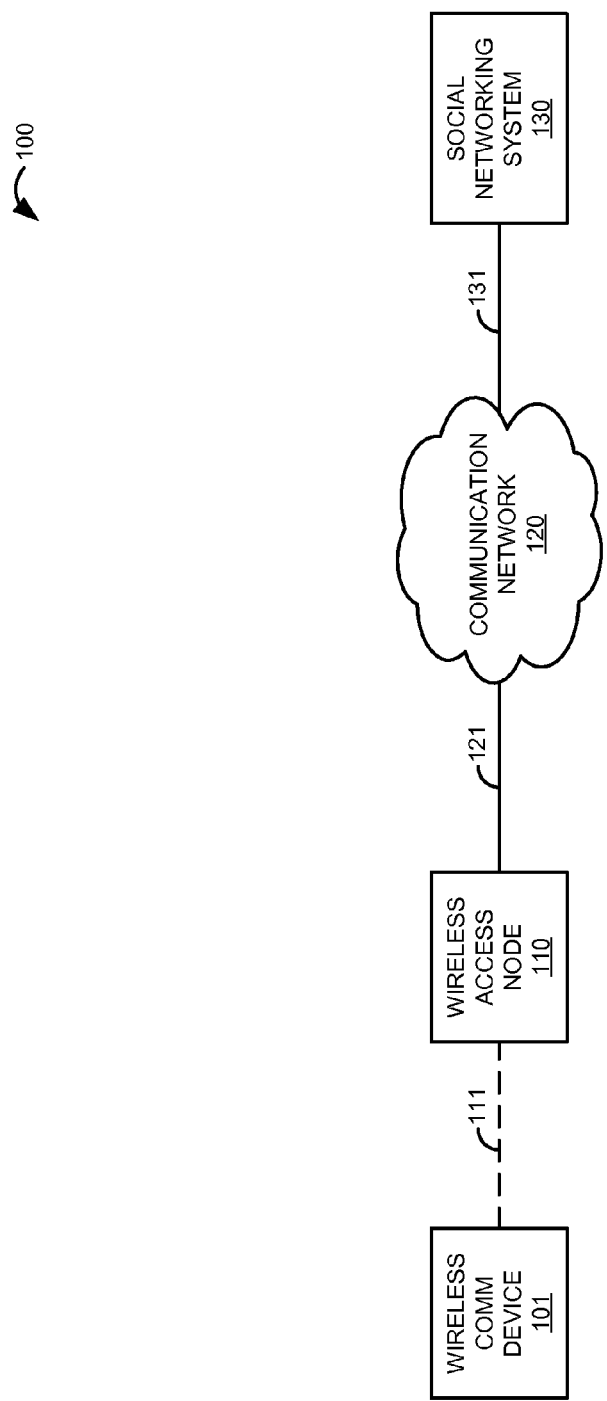
FIG. 1 is a block diagram that illustrates a communication system.

FIG. 1 is a block diagram that illustrates communication system 100. Communication system 100 includes wireless communication device 101, wireless access node 110, communication network 120, and social networking system 130. Wireless communication device 101 is in communication with wireless access node 110 over wireless communication link 111. Wireless access node 110 communicates with communication network 120 over communication link 121. Social networking system 130 is in communication with communication network 120 over communication link 131.

Figure 2:
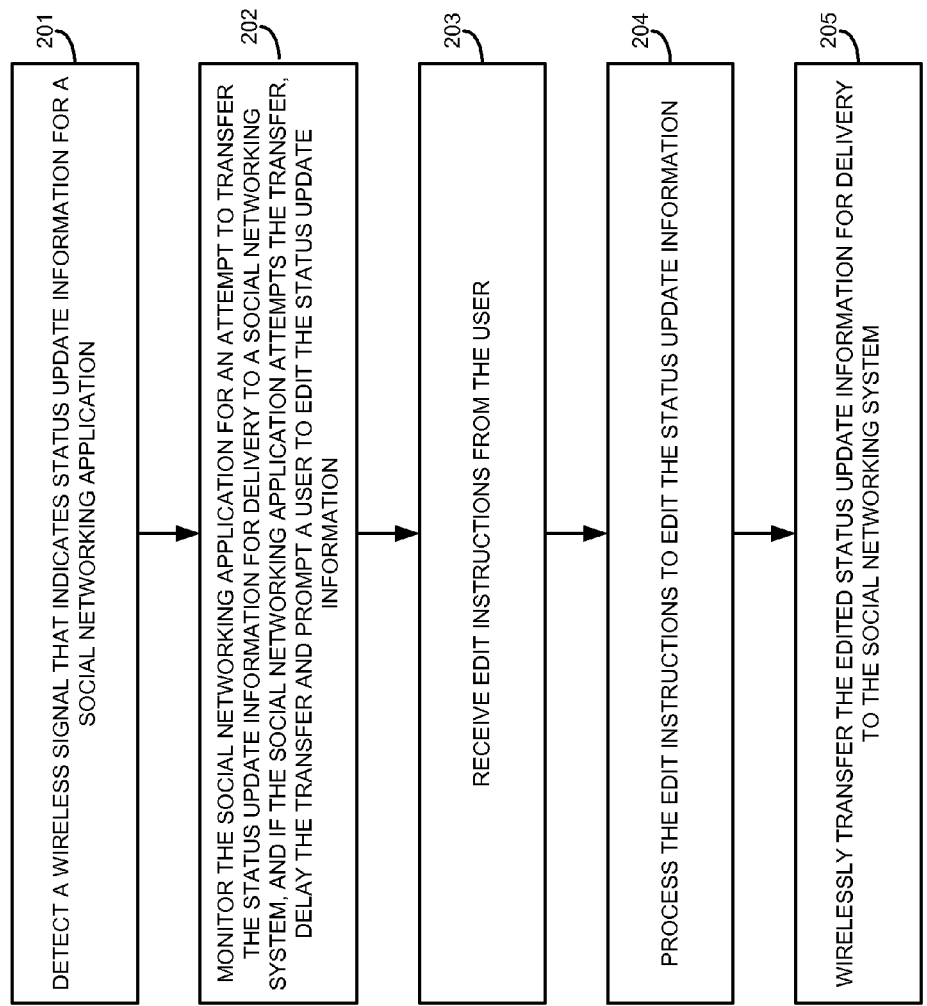
FIG. 2 is a flow diagram that illustrates an operation of the communication system.

FIG. 2 is a flow diagram that illustrates an operation of communication system 100. The steps of the operation are indicated below parenthetically. In FIG. 2, wireless communication device 101 detects a wireless signal that indicates status update information for a social networking application (201). The wireless signal could originate from any object comprising a wireless communication interface, such as RF communication circuitry and an antenna. In some examples, the wireless signal could originate from a wireless access point, a printed work such as a book, newspaper, or magazine with RF communication capabilities, or any other item comprising a wireless communication interface capable of wirelessly propagating a wireless signal to wireless communication device 101. The status update information typically comprises data associated with the source of the wireless signal, or a present situation or condition of a user of wireless communication device 101, such as a current location or activity of the user. In some examples, the social networking application is installed on wireless communication device 101, but the application could be accessed from a server, such as loading a web site in a web browser of wireless communication device 101, for example.

In response to detecting the wireless signal that indicates status update information, wireless communication device 101 monitors the social networking application for an attempt to transfer the status update information for delivery to social networking system 130 (202). In some examples, social networking system 130 is associated with the social networking application, although the social networking application could be a universal client application configured to communicate with multiple different social networking systems. While monitoring the social networking application, if wireless communication device 101 determines that the social networking application attempts to transfer the status update information to social networking system 130, wireless communication device 101 delays the transfer and prompts a user to edit the status update information (202). Wireless communication device 101 may delay the social networking application's attempt to transfer the status update information by blocking the packets associated with the transfer attempt, temporarily blocking all communications to a port associated with social networking system 130, temporarily disabling communication connectivity to communication network 120, or any other technique to prevent a transmission of the status update information to social networking system 130. Typically, wireless communication device 101 prompts the user to edit the status update information by displaying a notification on a user interface of device 101.

In response to prompting a user to edit the status update information, wireless communication device 101 receives edit instructions from the user (203). Typically, wireless communication device receives the edit instructions from the user through a user interface of device 101, such as by receiving textual or speech input from the user. The edit instructions could comprise alterations to the content of the status update information, or the user could select predetermined status update information to replace the status update information. For example, when wireless communication device 101 prompts the user to edit the status update information in operation 202, device 101 may display a list of predetermined status update information on a user interface. In this case, wireless communication device 101 may be configured to receive the edit instructions from the user by receiving a selection from the list of predetermined status update information through the user interface.

In response to receiving the edit instructions from the user, wireless communication device 101 processes the edit instructions to edit the status update information (204). Typically, wireless communication device 101 alters the status update information with the edit instructions provided by the user to generate edited status update information. However, in some examples, wireless communication device 101 may edit the status update information with the user's selection from a list of predetermined status update information, or may automatically edit the status update information with predetermined status update information. In these examples, the list of predetermined status update information could comprise previously used status update information that was transferred for delivery to social networking system 130 in the past.

Once the edited status update information is generated, wireless communication device 101 wirelessly transfers the edited status update information for delivery to social networking system 130 (205). Wireless communication device 101 would typically transfer the edited status update information to social networking system 130 via a wireless communication interface. In some examples, wireless communication device 101 allows the social networking application to transfer the edited status update information by substituting the edited status update information for the initial status update information without informing the social networking application of the substitution.

Advantageously, when wireless communication device 101 detects a wireless signal that indicates status update information for a social networking application, device 101 may intercept an attempt by the social networking application to transfer the status update information to social networking system 130. Wireless communication device 101 then prompts a user of device 101 to edit the status update information. In this manner, wireless communication device 101 helps prevent the transfer of status update information to social networking system 130 that the user may find undesirable or wish to edit. This may occur, for example, when the user is attending a sporting event during a weekday, and the user edits the status update information related to the sporting event to instead indicate that the user is conducting research at the library.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, metropolitan-area networks (MAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Social networking system 130 comprises a computer system and communication interface. Social networking system 130 may also include other components such as a router, server, data storage system, and power supply. Social networking system 130 may reside in a single device or may be distributed across multiple devices. Social networking system 130 may be a discrete system or may be integrated within other systems—including other systems within communication system 100. Social networking system 130 could comprise a packet gateway, mobile switching center, network gateway system, Internet access node, application server, service node, firewall, or some other communication system—including combinations thereof. Some examples of social networking system 130 could include web servers such as those operated by the websites Facebook (www.facebook.com), Twitter (www.twitter.com), Friendster (www.friendster.com), MySpace (www.myspace.com), and Google Buzz (buzz.google.com). Other examples of social networking system 130 may comprise systems providing Instant Messaging (IM) services, email systems, short message service (SMS) systems, or any other system that receives status update information for a user.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport media—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
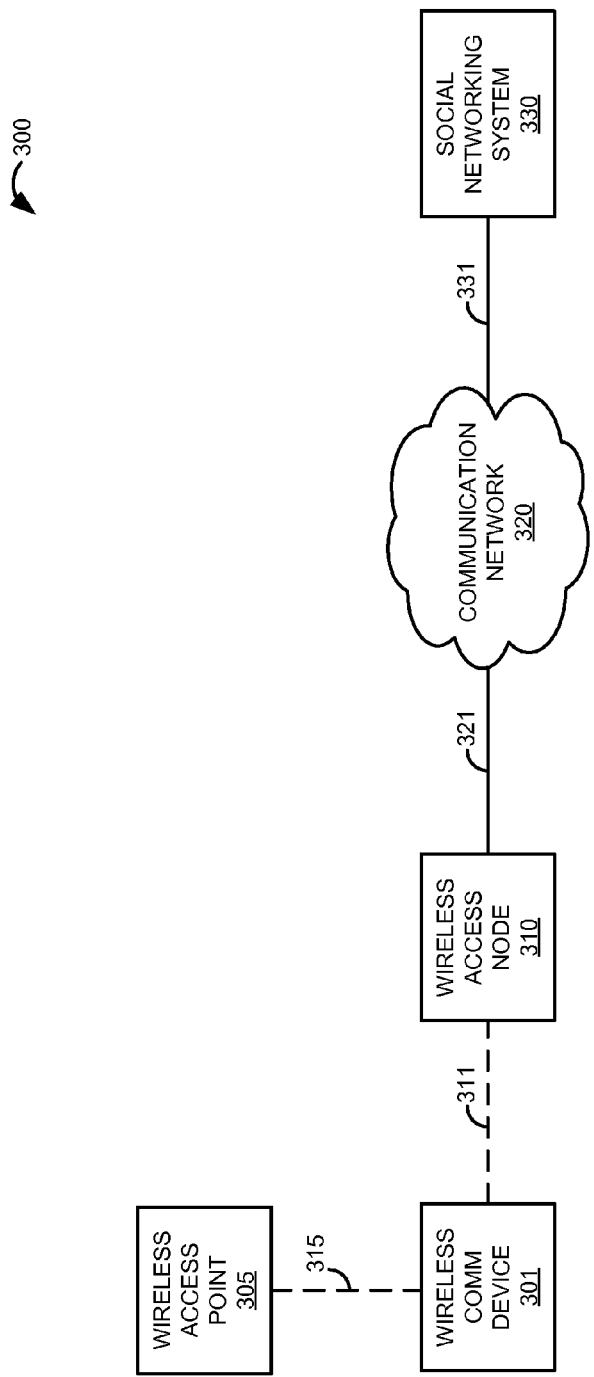
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access point 305, wireless access node 310, communication network 320, and social networking system 330. Wireless communication device 301 is in communication with wireless access node 310 over wireless communication link 311. Wireless communication device 301 is also in communication with wireless access point 305 over wireless communication link 315. Wireless access node 310 communicates with communication network 320 over communication link 321. Social networking system 330 communicates with communication network 320 over communication link 331.

Figure 4:
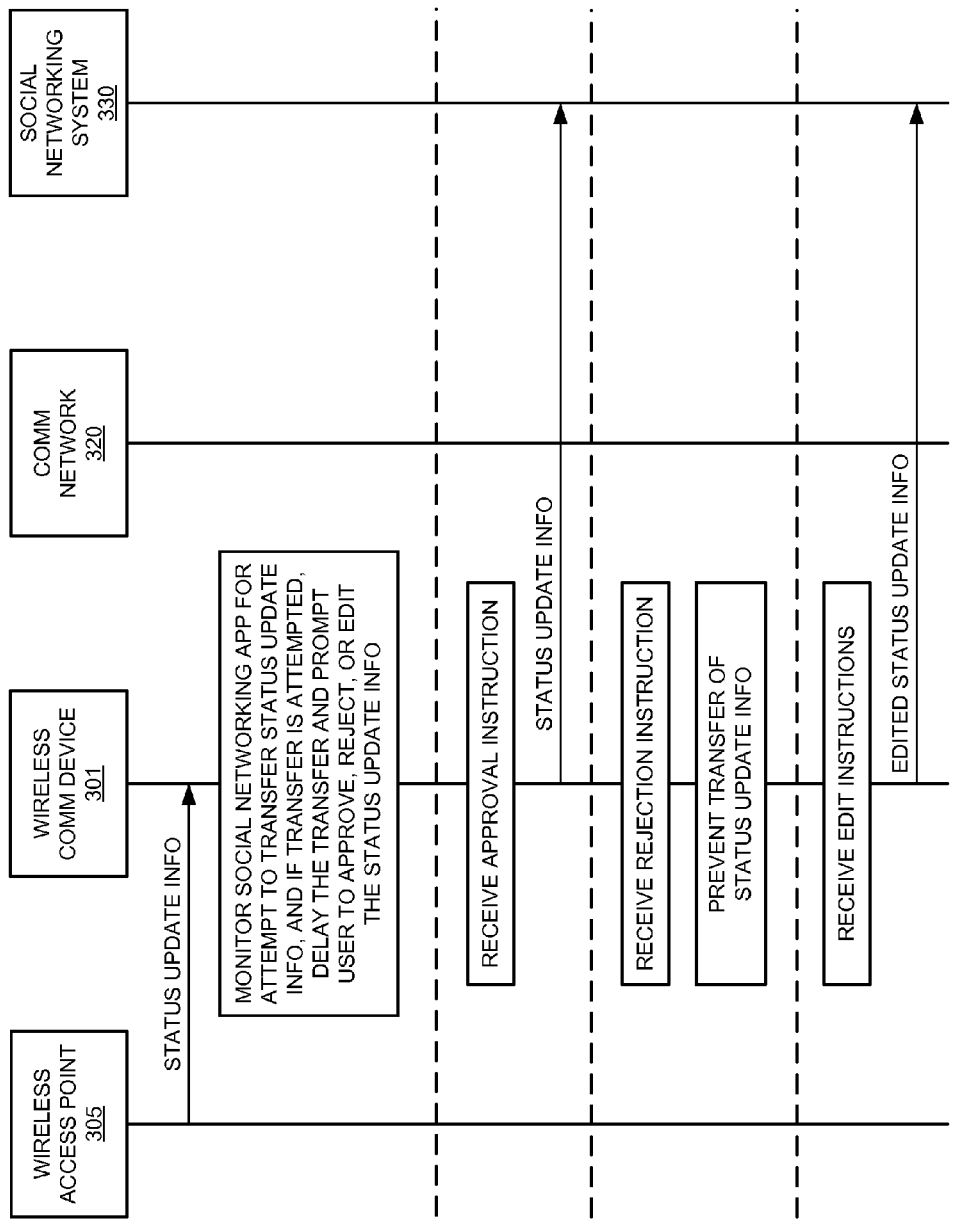
FIG. 4 is a sequence diagram that illustrates an operation of the communication system in the exemplary embodiment.

FIG. 4 is a sequence diagram that illustrates an operation of communication system 300 in an exemplary embodiment. Wireless communication device 301 is programmed with a user's account or profile information associated with social networking system 330, and is therefore capable of communicating with social networking system 330 directly through communication network 320. In cases where the user's profile or login information for social networking system 330 is unknown to wireless communication device 301, device 301 may prompt the user for the necessary account information.

As shown in FIG. 4, wireless communication device 301 receives a wireless signal from wireless access point 305 that indicates status update information. The status update information is typically intended for a social networking application associated with social networking system 330 that is installed and executing on wireless communication device 301. For example, wireless access point 305 may comprise a Wi-Fi hotspot located in an eating establishment where the user of wireless communication device 301 is currently a patron. As a precondition or incidental to providing free Internet access, the proprietor of the eating establishment may configure wireless access point 305 to transfer status update information to wireless communication device 301 that indicates the user's presence at the eating establishment. In this manner, the proprietor intends for the status update information to automatically update the user's profile on social networking system 330 so that friends and associates of the user will be informed of the user's presence at the eating establishment and will consider joining the user, thereby creating additional business for the proprietor.

Wireless communication device 301 detects the wireless signal from wireless access point 305, and in response, monitors a social networking application installed on wireless communication device 301 for an attempt to transfer the status update information to social networking system 330. If wireless communication device 301 detects that the social networking application attempts the transfer, wireless communication device 301 intercepts and delays the transfer of the status update information to social networking system 330. Wireless communication device 301 then prompts the user to approve, reject, or edit the status update information.

In response to the prompt, the user may provide an approval instruction, a rejection instruction, or edit instructions on a user interface of wireless communication device 301. A processing system of wireless communication device 301 then processes the user's instructions and takes appropriate action according to the instructions received from the user. These different actions in response to the different user instructions are shown separately on FIG. 4 by the three sections indicated by the dashed lines.

In the first section, the user provides an approval instruction through a user interface in response to the prompt from wireless communication device 301. The approval instruction indicates to wireless communication device 301 that the user accepts the status update information as received from wireless access point 305, and instructs wireless communication device 301 to proceed with the transfer of the status update information to social networking system 330. Thus, when the user interface of wireless communication device 301 receives the approval instruction from the user, the processing system processes the approval instruction and directs the wireless communication interface of device 301 to wirelessly transfer the status update information for delivery to the social networking system 330. In some examples, the processing system directs the wireless communication interface of device 301 to wirelessly transfer the status update information for delivery to social networking system 330 by simply permitting the social networking application to transfer the status update information for delivery to social networking system 330.

In the second section indicated by the dashed lines, the user provides a rejection instruction through a user interface in response to the prompt from wireless communication device 301. The rejection instruction indicates to wireless communication device 301 that the user rejects the status update information as received from wireless access point 305, and instructs wireless communication device 301 to prevent the transfer of the status update information to social networking system 330. Thus, when the user interface of wireless communication device 301 receives the rejection instruction from the user, the processing system processes the rejection instruction to prevent the transfer of the status update information to social networking system 330.

Finally, if the user provides edit instructions in response to the prompt from wireless communication device 301, the processing system of device 301 processes the edit instructions to edit the status update information provided by wireless access point 305. For example, the edit instructions may instruct wireless communication device 301 to change the status update information from an indication of the user's presence at the eating establishment to indicate the user's presence at school, work, or some other location. Wireless communication device 301 edits the status update information by processing the edit instructions provided by the user to generate edited status update information. Once the edited status update information is generated, wireless communication device 301 wirelessly transfers the edited status update information for delivery to social networking system 330 via a wireless communication interface.

Figure 5:
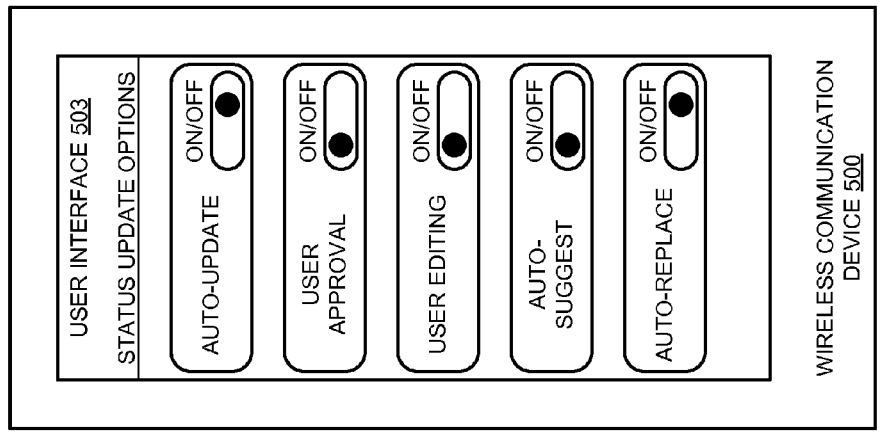
FIG. 5 is a block diagram that illustrates exemplary status update options on a user interface of a wireless communication device.

FIG. 5 is a block diagram that illustrates exemplary status update options on user interface 503 of wireless communication device 500. The status update options displayed on user interface 503 allow a user of wireless communication device 500 to configure the behavior of wireless communication device 500 in response to detecting a wireless signal indicating status update information. Note that the status update options presented in user interface 503 are exemplary, and not all of these options may be available to a user of wireless communication device 500.

The first status update option shown on user interface 503 is the "auto-update" option. The "auto-update" option allows a user of wireless communication device 500 to configure device 500 to never prompt the user to approve, reject, or edit status update information that is detected by wireless communication device 500. In other words, by turning on the "auto-update" option, the user configures wireless communication device 500 to automatically allow transfers of status update information for delivery to a social networking system. Note that the "auto-update" option has an inverse relationship with the "user approval" and "user editing" options. For example, if the "auto-update" option is enabled, the "user approval" and "user editing" options will typically be disabled, and vice versa.

The "user approval" option allows a user to configure wireless communication device 500 to require confirmation from a user prior to transferring status update information to a social networking system. Typically, when a user enables the "user approval" option, wireless communication device 500 prompts the user to approve or reject any status update information that is detected by device 500. In other words, the processing system of wireless communication device 500 is configured to determine whether the "user approval" option is enabled prior to directing the user interface to prompt the user to approve or reject the status update information. However, note that when the user enables the "user approval" option, wireless communication device 500 may prompt the user for approval prior to transferring any status update information, even edited status update information or automatically-suggested status update information as discussed below.

The "user editing" option allows a user to configure wireless communication device 500 to enable the ability for the user to edit a status update message before the message is transferred for delivery to a social networking system. Thus, when a user enables the "user editing" option, wireless communication device 500 prompts the user to provide edit instructions to edit the status update information received by device 500. In order to comply with the "user editing" option, the processing system of wireless communication device 500 is configured to determine whether the "user editing" option is enabled prior to directing the user interface to prompt the user to edit the status update information.

The "auto-suggest" option allows a user to configure wireless communication device 500 to provide automatic suggestions of alternative status update information with respect to the status update information received by device 500. For example, when the "auto-suggest" option is enabled, wireless communication device 500 may suggest status update information that the user had previously approved for transfer to a social networking system. The previous status update information may be stored in a memory device of wireless communication device 500, and could comprise a previous location or previous status of the user. In other examples, a predetermined list of status update information may be stored in a memory device of wireless communication device 500. Wireless communication device 500 may select from either the previous status update information and/or the predetermined list in order to provide automatic suggestions of status update information to the user. For example, wireless communication device 500 could automatically select status update information based on a priority assigned by the user, based on a frequency that a status update was previously transferred or approved by the user for delivery to a social networking system, based on default values assigned by the user, or based on a random selection.

Finally, the "auto-replace" option allows a user to configure wireless communication device 500 to automatically replace status update information received by device 500 with replacement status update information. The "auto-replace" option is similar to the "auto-suggest" option, except that the "auto-replace" option is typically intended to work in conjunction with the "auto-update" option to direct wireless communication device 500 to automatically replace status update information with replacement status update information and automatically transfer the replacement status update information for delivery to a social networking system. However, if the user enables the "auto-replace" and "user approval" options, wireless communication device 500 will still prompt the user for approval to transfer the automatically-replaced status update information for delivery to a social networking system. In some examples, wireless communication device 500 could automatically replace the status update information by selecting from the previous status update information and/or the predetermined list of status update information based on the same criteria as discussed above with respect to the "auto-suggest" option. In other examples, the user may define a second predetermined list of status update information for use by wireless communication device 500 when the "auto-replace" option is enabled, and device 500 would only automatically replace status update information received by device 500 with replacement status update information selected from the second predetermined list.

In other examples, the user may configure wireless communication device 500 with various rules that govern the automatic behavior of device 500 with respect to the "auto-update" option for automatic status updates. For example, the user could configure a profile to predetermine which status updates are automatically allowed, blocked, or replaced. In this manner, status update information associated with a particular social networking system may be handled differently from status updates associated with a different social networking system based on the user's profile. In addition, the preconfigured rules in the user's profile could direct wireless communication device 500 to automatically allow, block, or replace status update information based on a time, location, or content of the status update.

In some examples related to status updates based on a time, a user may configure wireless communication device 500 to automatically block all status updates during a work day to prevent the transfer of status update information to a social networking system while the user is at work. In an alternative example, the user could designate a block of time, such as the next two hours, and configure a universal status update to be automatically transferred by any social networking application that attempts to transfer status update information, such as "studying at the library."

In other examples, the user may have subscribed to a location-based social networking system, and a social networking application on wireless communication device 500 may attempt to automatically transfer status update information to the location-based social networking system whenever the user arrives at a new location. In this case, the user could configure a list of preapproved locations, and wireless communication device 500 would only automatically transfer status update information for a particular location if the location appears in the user's list of preapproved locations.

Finally, the content of status update information could be analyzed by wireless communication device 500 to determine whether to allow the information for automatic transfer to a social networking system based on rules configured by the user. For example, wireless communication device 500 may detect a wireless signal from a television remote control that indicates status update information for a social networking application related to a particular television program currently viewed by the user. However, the user may not desire to disclose the actual television program the user is viewing, such as a reality television program. In this case, the user may configure wireless communication device 500 to prevent the transfer of the status update information by setting a rule to block all status update attempts related to the user viewing the reality television program. In another example, the user may configure the "auto-replace" option to automatically replace all status updates related to reality shows with a news program instead. In this manner, the user may conceal the actual television program being viewed, thereby preserving some degree of privacy for the user.

Figure 6:
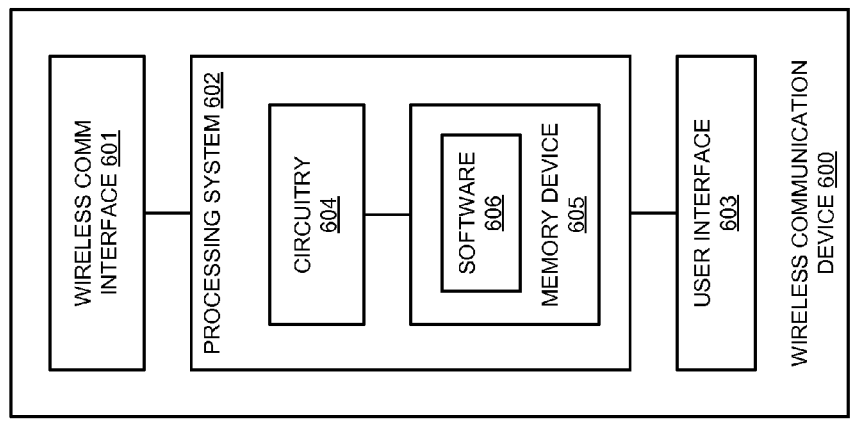
FIG. 6 is a block diagram that illustrates a wireless communication device.

FIG. 6 is a block diagram that illustrates wireless communication device 600. Wireless communication device 600 provides an example of wireless communication devices 101, 301, and 500, although devices 101, 301, and 500 could use alternative configurations. Wireless communication device 600 comprises wireless communication interface 601, processing system 602, and user interface 603. Processing system 602 is linked to wireless communication interface 601 and user interface 603. Processing system 602 includes processing circuitry 604 and memory device 605 that stores operating software 606. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication interface 601 may be configured to detect a wireless signal that indicates status update information for a social networking application, and to wirelessly transfer edited status update information for delivery to a social networking system.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples. User interface 603 may be configured to prompt a user to edit status update information and to receive edit instructions from the user.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication interface 601 and user interface 603. Operating software 606 comprises computer programs, firmware, or some other form of machine-readable processing instructions. Operating software 606 may include an operating system, utilities, drivers, network interfaces, applications, or some other type of software. When executed by processing circuitry 604, operating software 606 directs processing system 602 to operate wireless communication device 600 as described herein for wireless communication devices 101, 301, and 500.

In particular, operating software 606 directs processing system 602 to direct wireless communication interface 601 to detect a wireless signal that indicates status update information for a social networking application. Further, operating software 606 directs processing system 602 to monitor the social networking application for an attempt to transfer the status update information for delivery to a social networking system, and if the social networking application attempts the transfer, to delay the transfer and direct user interface 603 to prompt a user to edit the status update information. In addition, operating software 606 directs processing system 602 to process the edit instructions to edit the status update information and to direct wireless communication interface 601 to transfer the edited status update information for delivery to the social networking system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
   a wireless communication interface configured to detect a wireless signal that indicates status update information for a social networking application;
   a processing system configured to monitor the social networking application for an attempt to transfer the status update information for delivery to a social networking system, and if the social networking application attempts the transfer, to delay the transfer and direct a user interface to prompt a user to edit the status update information;
   the user interface configured to prompt the user to edit the status update information and to receive edit instructions from the user, wherein the edit instructions comprise substituting a portion of the text of the status update with other text;
   the processing system configured to process the edit instructions to edit the status update information and to direct the wireless communication interface to transfer the edited status update information for delivery to the social networking system; and
   the wireless communication interface configured to wirelessly transfer the edited status update information for delivery to the social networking system without informing the social networking system of the substitution.

2. The wireless communication device of claim 1 wherein the processing system is configured to direct the user interface to prompt the user to approve or reject the status update information, and the user interface is configured to prompt the user to approve or reject the status update information.

3. The wireless communication device of claim 2 wherein the processing system is configured to determine whether a user approval option is enabled prior to directing the user interface to prompt the user to approve or reject the status update information.

4. The wireless communication device of claim 2 wherein the user interface is configured to receive an approval instruction from the user, the processing system is configured to process the approval instruction to direct the wireless communication interface to transfer the status update information for delivery to the social networking system, and the wireless communication interface is configured to wirelessly transfer the status update information for delivery to the social networking system.

5. The wireless communication device of claim 2 wherein the user interface is configured to receive a rejection instruction from the user, and the processing system is configured to process the rejection instruction to prevent the transfer of the status update information to the social networking system.

6. The wireless communication device of claim 1 wherein the processing system is configured to determine whether a user editing option is enabled prior to directing the user interface to prompt the user to edit the status update information.

7. The wireless communication device of claim 1 wherein the user interface is configured to prompt the user to edit the status update information by displaying a list of predetermined status update information, and configured to receive the edit instructions from the user by receiving a selection from the list of predetermined status update information from the user.

8. The wireless communication device of claim 7 wherein the processing system is configured to process the edit instructions to edit the status update information by editing the status update information with the selection from the list of predetermined status update information.

9. The wireless communication device of claim 1 wherein the processing system is configured to process the edit instructions to edit the status update information by automatically editing the status update information with predetermined status update information.

10. The wireless communication device of claim 1 wherein the wireless communication interface is configured to detect the wireless signal that indicates the status update information from a printed work.

11. A method of operating a wireless communication device, the method comprising:
    detecting a wireless signal that indicates status update information for a social networking application;
    monitoring the social networking application for an attempt to transfer the status update information for delivery to a social networking system, and if the social networking application attempts the transfer, delaying the transfer and prompting a user to edit the status update information;
    receiving edit instructions from the user, wherein the edit instructions comprise substituting a portion of the text of the status update with other text;
    processing the edit instructions to edit the status update information; and
    wirelessly transferring the edited status update information for delivery to the social networking system without informing the social networking system of the substitution.

12. The method of claim 11 further comprising prompting the user to approve or reject the status update information.

13. The method of claim 12 further comprising determining whether a user approval option is enabled prior to prompting the user to approve or reject the status update information.

14. The method of claim 12 further comprising receiving an approval instruction from the user, processing the approval instruction, and wirelessly transferring the status update information for delivery to the social networking system.

15. The method of claim 12 further comprising receiving a rejection instruction from the user, processing the rejection instruction, and preventing the transfer of the status update information to the social networking system.

16. The method of claim 11 further comprising determining whether a user editing option is enabled prior to prompting the user to edit the status update information.

17. The method of claim 11 wherein prompting the user to edit the status update information comprises displaying a list of predetermined status update information, and wherein receiving the edit instructions from the user comprises receiving a selection from the list of predetermined status update information from the user.

18. The method of claim 17 wherein processing the edit instructions to edit the status update information comprises editing the status update information with the selection from the list of predetermined status update information.

19. The method of claim 11 wherein processing the edit instructions to edit the status update information comprises automatically editing the status update information with predetermined status update information.

20. A wireless communication device comprising:
a wireless communication interface configured to detect a wireless signal that indicates status update information for a social networking application;
a processing system configured to monitor the social networking application for an attempt to transfer the status update information for delivery to a social networking system, and if the social networking application attempts the transfer, to delay the transfer and direct a user interface to prompt a user to approve, reject, or edit the status update information;
the user interface configured to prompt the user to approve, reject, or edit the status update information and to receive an approval instruction, a rejection instruction, or edit instructions from the user, wherein the edit instructions comprise substituting a portion of the text of the status update with other text;
in response to the approval instruction, the processing system configured to process the approval instruction to direct the wireless communication interface to transfer the status update information for delivery to the social networking system, and the wireless communication interface configured to wirelessly transfer the status update information for delivery to the social networking system;
in response to the rejection instruction, the processing system configured to process the rejection instruction to prevent the transfer of the status update information to the social networking system; and
in response to the edit instructions, the processing system configured to process the edit instructions to edit the status update information and to direct the wireless communication interface to transfer the edited status update information for delivery to the social networking system, and the wireless communication interface configured to wirelessly transfer the edited status update information for delivery to the social networking system without informing the social networking system of the substitution.

\* \* \* \* \*